United States Patent Office 3,356,273
Patented Dec. 5, 1967

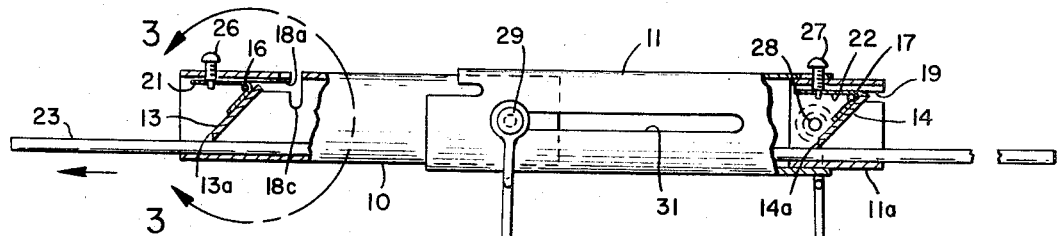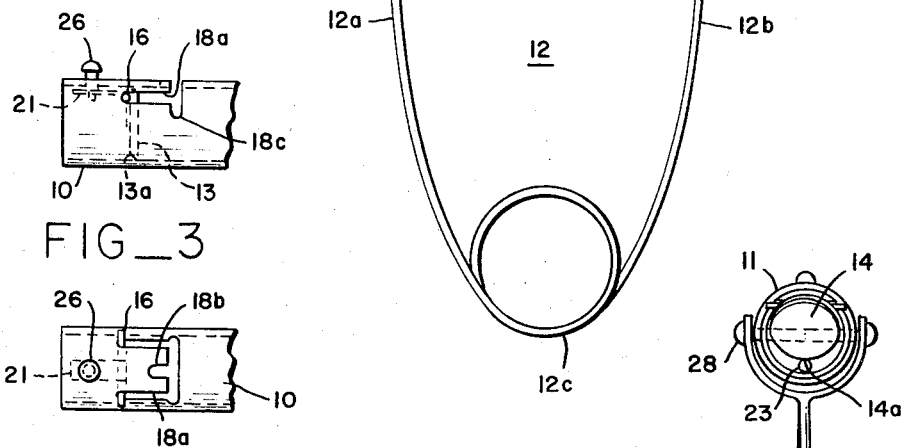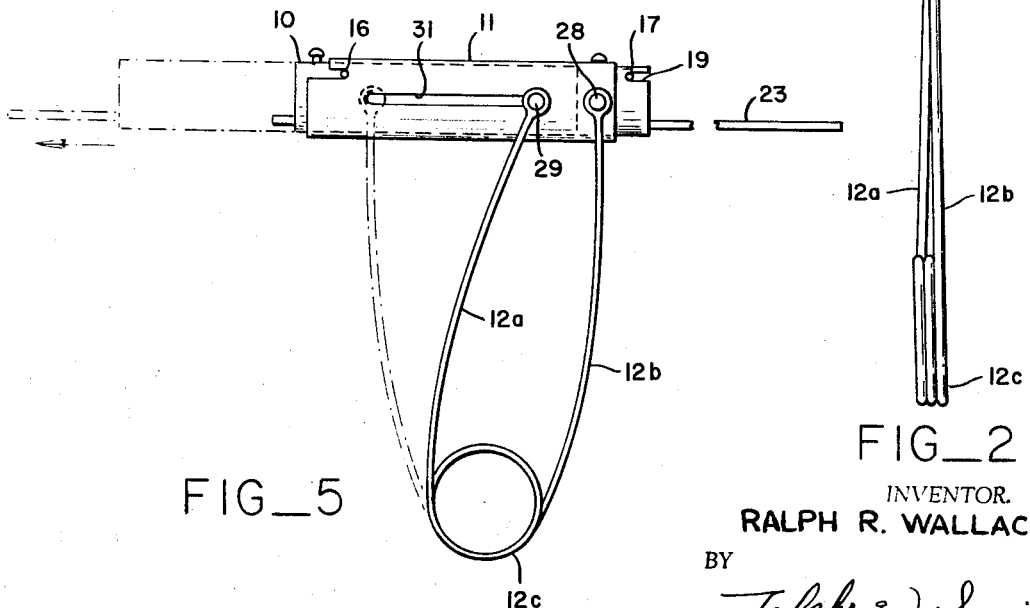

3,356,273
MANUAL WELDING WIRE FEEDER
Ralph R. Wallace, 35 Alcala Court,
Pacifica, Calif. 94044
Filed Dec. 20, 1965, Ser. No. 515,015
2 Claims. (Cl. 226—128)

ABSTRACT OF THE DISCLOSURE

A manual welding wire feeder device operates by means of a resilient coiled spring gripper handle. Compression of the two parts of the handle moves a telescopically arranged tubular barrel in one direction without advancing the wire while release of the handle advances the wire by engagement of grip members at opposite ends of the telescopic arrangement.

The present invention is directed to a manual welding wire feeder, and more specifically to a device which feeds welding wire, rod, hard or soft solders and plastic strip materials to a work piece when manual gripping force is applied to its handle.

Welding wire or rod is normally held by a hand as it is applied to the work piece. With the advent of new types of welding using softer materials, such as aluminum, the welding wire is normally supplied in a rolled form. The application of wire, especially the softer wire, to the work piece is difficult when it is manipulated by the hand of the welder.

Thus, mechanical feeding means adaptable to many different sizes, types and shapes of welding wire is desirable. Moreover, since the environment in which the welding takes place is severe, such feeding means should be rugged and simple.

It is an object of this invention to provide an improved manual welding wire feeder.

A further object of the invention is to provide a welding wire feeder which is simple in construction, durable, inexpensive, and performs effectively with many different types and shapes of welding wire.

In accordance with the above objects, the invention is characterized by handle means comprising two elongated members which are adapted to be moved towards each other when manual gripping force is applied. The handle means also includes means for yieldably urging the elongated members apart. Two unidirectional feed devices adapted to engage a common welding wire and feed it in one direction when they are reciprocated in opposite directions by manual movement of the elongated members are attached to corresponding extremities of the elongated members.

Further objects and features of the invention will appear from the following description in which the preferred embodiment of the invention has been set forth in detail in conjunction with the accompanying drawing.

Referring to the drawing:

FIGURE 1 is a side elevational view, partially in section, showing an improved manual welding wire feeder embodying the present invention;

FIGURE 2 is an end elevational view of the wire feeder shown in FIGURE 1;

FIGURE 3 is a partial elevational view of the portion 3—3 of FIGURE 1 showing the device without a welding wire;

FIGURE 4 is a plan view of the portion shown in FIGURE 3; and

FIGURE 5 is an elevational view illustrating the operation of the invention.

The manual welding wire feeder of the present invention comprises a pair of telescoped tubular structures 10, 11 (FIGURES 1 and 2) attached to a handle 12. The handle includes two elongated members 12a and 12b which are the end portions of a coiled spring 12c which serves to yieldably urge members 12a and 12b apart. Handle 12 is proportioned to fit between the palm and fingers of the hand of the welder so he may comfortably grip it. The outer ends of the tubular structures 10 and 11 encircle uni-directional feed devices which comprise grip members 13 and 14 which are pivoted about pins 16 and 17, respectively. The grip members include arcuate gripping edges 13a and 14a which have a contour substantially similar to the adjacent wall portion of the tube. Pins 16 and 17 are mounted in slots 18 and 19, respectively, which are provided at the top portions of tubes 10 and 11. Slot 18, best shown in FIGURES 3 and 4, includes longitudinal portions 18a and 18b, and vertical portion 18c, providing for easy insertion of a spring which is to be described below. Longitudinal slot 19 is provided in an extension 11a of tube 11.

L-shaped flat springs 21 and 22 bias grip members 13 and 14 in a counterclockwise direction around pins 16 and 17 so that gripping edges 13a and 14a engage one side of a welding wire 23 to urge it against the walls of tubular structures 10 and 11. One end of the respective springs 21 and 22 is bent around the pins 16 and 17 and affixed to gripping members 13 and 14 and the other end is adjustably positioned with respect to the wall of tubes 10 and 11 by screws 26 and 27 which are threadably received by tubular members 10 and 11. The end of each screw extends into a hole in corresponding spring 21 and 22. Rotation of the screw will adjust the spring tension and bias of the gripping member with respect to the welding wire. For optimum performance, it is desirable that spring tension be roughly equivalent in each gripping member 13 and 14.

Gripping members 13 and 14, in conjunction with their associated springs and tubular structure, thus serve as individual, uni-directional feed devices which are attached to the extremities of handle members 12a and 12b. Specifically, handle member 12b terminates in a bifurcated end (FIGURE 2) and is pivotally coupled to tube 11 by a pin 28 which extends through both legs of the bifurcation and the tube. Similarly, handle member 12a is pivotally coupled to tube 10 by means of a pin 29. A pair of slots 31 (only one shown) in tube 11 allows the pin 29 and its associated tubular member 11 to be telescoped into tube 11 as shown in FIGURE 5. The slot 31, in conjunction with pin 29, also serves as a means for maintaining the two tubular structures in telescoped engagement.

Operation

Welding wire 23 is inserted into the manual welding wire feeder device of the present invention from the right end as viewed in FIGURE 1 so as to push gripping members 13 and 14 out of their rest positions as shown in FIGURE 3, into the gripping position where gripping edges 13a and 14a engage the top surface of the welding wire. The clearances between the gripping edges 13a and 14a with the bottom walls of tubes 10 and 11 are adjusted to correspond to the size or diameter of the welding wire to be used in the device. For example, a clearance of $\frac{1}{32}$ inch has been found to be satisfactory for welding wire having a diameter in the range of from $\frac{1}{16}$ to $\frac{5}{32}$ inch. With a larger diameter welding wire the above mentioned clearance should be proportionately increased.

In addition, the flexibility and surface characteristics of the welding wire are taken into account by adjustment of the spring tension of springs 21 and 22 by means of adjustment screws 26 and 27. For example, with a very flexible type wire the spring tension must be proportionally less to avoid a buckling of the wire during the operation of the feeder device.

The operation is best illustrated in FIGURE 5 where as shown in dashed outline the tubes 10 and 11 are in their fully extended position. When handle 12 is gripped by the user, gripping member 13 is allowed to ride along the surface of welding wire 23 while gripping member 14 functions a pawl to keep the wire from moving backwards. Upon completion of the gripping action, the tubes are telescoped as shown by the solid line tube 10. Release of the handle 12 will cause gripping member 13 to grip the welding wire 23, bringing it forward to the work piece and slippage will occur between gripping member 14 and the bottom of tube 11. Thus, the reciprocating action of the user's hand on handle 12 will cause the welding wire 23 to be fed in the desired direction toward the work piece by the uni-directional feed devices.

In summary, the invention as described above provides a simple and inexpensive manual welding wire feeder where the handle 12 provides the additional function of yieldably urging members 12a and 12b and their associated telescoped tubular members 10 and 11 apart. With this simple rugged construction, the feeder device will perform satisfactory in the most severe environments and under rough use. Moreover, the arcuate design of the gripping edges 13a and 14a compensate for unusual curvatures of welding wire since the wire can be located in several different positions and adequate gripping force will still be maintained.

I claim:

1. In a manual welding wire feeder, handle means comprising two elongated members adapted to be moved toward each other when manual gripping force is applied together with means for yieldably urging the members apart, said elongated members being the end portions of a coiled spring which serves to yieldably urge the members apart, and two uni-directional feed devices attached to corresponding extremities of the elongated members, said devices being adapted to engage a common wire and to feed the same in one direction when the devices are reciprocated in opposite directions by manual movement of said members.

2. In a manual welding wire feeder, handle means comprising two elongated members adapted to be moved toward each other when manual gripping force is applied together with means for yieldably urging the members apart, and two uni-directional feed devices attached to corresponding extremities of the elongated members, said devices being adapted to engage a common wire and to feed the same in one direction when the devices are reciprocated in opposite directions by manual movement of said members, said uni-directional feed devices including a pair of telescopic tubular structures, each of said structures having a grip member for engaging one side of a wire and placing the wire in contact with the wall of the respective tubular structures, each of said grip members having an arcuate gripping edge with a contour substantially similar to the adjacent wall portion of the tubular structure.

References Cited

UNITED STATES PATENTS 2,604,064  7/1952  Sefton _____ 226—128

M. HENSON WOOD, JR., *Primary Examiner.*

R. A. SCHACHER, *Assistant Examiner.*